(12) United States Patent
Elder

(10) Patent No.: US 7,085,115 B2
(45) Date of Patent: Aug. 1, 2006

(54) NON-FERROUS SURGE BIASING COIL HAVING MULTIPLE PAIRS OF COILS POSITIONED AT ANGLES TO ONE ANOTHER

(76) Inventor: Kenneth M. Elder, 9693 105th Ter. North, Largo, FL (US) 33773

( * ) Notice: Subject to any disclaimer, the term of this patent is extended or adjusted under 35 U.S.C. 154(b) by 394 days.

(21) Appl. No.: 10/601,991

(22) Filed: Jun. 23, 2003

(65) Prior Publication Data

US 2004/0004799 A1    Jan. 8, 2004

Related U.S. Application Data

(60) Provisional application No. 60/390,894, filed on Jun. 25, 2002.

(51) Int. Cl.
*H02H 3/08*    (2006.01)
(52) U.S. Cl. .......................... 361/93.5; 361/56
(58) Field of Classification Search ............... 361/93.5, 361/56; 336/188, 220
See application file for complete search history.

(56) References Cited

U.S. PATENT DOCUMENTS

| | | | | |
|---|---|---|---|---|
| 4,092,582 A | * | 5/1978 | Newbould ................... | 323/362 |
| 4,563,720 A | | 1/1986 | Clark .......................... | 361/56 |
| 4,635,019 A | * | 1/1987 | Akachi et al. .............. | 336/180 |
| 4,876,713 A | * | 10/1989 | Crosby et al. .............. | 379/412 |
| 4,992,726 A | * | 2/1991 | Markow et al. ............. | 324/146 |
| 5,061,891 A | * | 10/1991 | Totsuka et al. ............. | 324/146 |
| 5,388,021 A | * | 2/1995 | Stahl ........................... | 361/56 |
| 5,414,350 A | * | 5/1995 | Chellman .................... | 324/143 |
| 5,519,368 A | | 5/1996 | Heise et al. .................. | 335/18 |
| 5,565,836 A | * | 10/1996 | Groehl et al. ............... | 336/225 |
| 6,046,583 A | * | 4/2000 | Ayres et al. ................. | 324/146 |

OTHER PUBLICATIONS

Ronald B. Standler, "Protection of Electronic Circuits From Overvoltages ," A Wiley-Interscience Publication , John Wiley & Sons (New York), pp. 113, 175-177, 186-187, (1989).

\* cited by examiner

*Primary Examiner*—Brian Sircus
*Assistant Examiner*—Luis Roman
(74) *Attorney, Agent, or Firm*—Larson & Larson, PA; Frank W. Liebenow; Herbert W. Larson

(57) ABSTRACT

A surge suppression device includes a first and second coil positioned in close proximity to one another such that the windings of each coil are disposed at an angle thereto. In a preferred embodiment, the coils are disposed such that the windings of each coil are placed at a right angle (90 degrees) to one another. However, angles of varying degree can be employed. Varying configurations of the coil winding placement include a "sandwiched" type configuration, a "one on the top of the other" configuration as well as an intertwined configuration. Each embodiment employs additional surge elements such as metal oxide varistors (MOVs). It is unnecessary to employ any ferrous material core for any of the coils used in the novel device of the present invention.

18 Claims, 4 Drawing Sheets

NON-FERROUS SURGE BIASING COIL HAVING MULTIPLE PAIRS OF COILS POSITIONED AT ANGLES TO ONE ANOTHER

PRIOR APPLICATIONS

This is a non-provisional utility patent application which bases priority on provisional patent application 60/390,894, filed on Jun. 25, 2002.

BACKGROUND OF THE INVENTION

1. Field of The Invention

This invention relates to a biasing coil used in multi-stage surge suppression and transient protection. More particularly, it relates to a non-ferrous biasing coil used in surge suppression and transient protection of electronic devices and data communication lines wherein multiple coils are employed in close proximity to one another, positioned at angles, and dual-wound.

2. Background of the Prior Art

Inductive-capacitive filter biasing coils used for the purpose of surge protection and surge suppression systems are known in the prior art. FIG. 3 of the drawings illustrates that a pair of biasing coils having a ferrous material core inserted within a center portion of each coil are used to offer surge protection to electronic devices and data communication lines. However, these coils are not dual wound; in fact they are separated by a measurable space, typically mounted on a circuit board (to be discussed in more detail hereinafter).

Other surge elements such as metal oxide varistors (MOV), avalanche diodes (SAD) and gas tube devices have been used for years to divert surge voltages and currents in a power or data communication line to ground as a method of protecting against surges. Surge elements, as used herein, are defined as devices that divert voltage and current surges.

Surge elements are typically connected in shunt configuration between two conductors in a power or data communication line circuit. The surge elements are therefore inert during normal circuit conditions (normal operating conditions) but conduct at low impedance during a surge voltage condition or other like transient anomaly.

Prior art surge elements are constructed in limited configurations and have limited surge handling capabilities. It is not uncommon in the prior art to provide parallel multiple stage surge devices to increase current conductive capabilities. Unfortunately, due to differences in the individual surge elements, it is difficult to bias the current through the multiple stage surge elements. In fact, it is quite typical that the surge current is unequal throughout the multiple surge elements thereby causing an insignificant improvement in current handling as that compared to individual surge elements capable of handling the surge or transient on its own.

Some prior art surge suppression devices insert a series inductive coil or resistor between multiple parallel connected surge elements. This type of circuit forces each surge element to share the available surge current. This current sharing reduces the circuit impedance under surge conditions thereby permitting a lower surge voltage to reach the protected electrical equipment or data communication lines downstream from the surge suppressor.

However, the aforementioned prior art devices have many inherent disadvantages which are not easily overcome. Some surge suppression devices are known to allow normal electrical voltages and currents to pass there through without reacting. However, some devices, employing series coils or resistors, conduct normal line current but experience heating during normal line current carrying conditions. This is undesirable. Series type devices must therefore be designed to limit the normal circuit current. However, this is also undesirable. To overcome these inherent problems of the prior art, very large coils can be employed in some surge suppression devices so that normal current conditions can be conducted. However, the use of very large coils can be expensive and be a waste of valuable, limited space; again achieving an undesirable result.

An attempt to improve the large coil problem involves winding much smaller coils around a ferrous material core (see FIG. 3), thereby reducing the number of turns needed for the coil. Ferrous materials are typically used since they have a high permeability and a small conductivity. Unfortunately, in AC electrical systems, the ferrous coil reacts to the changes in current, thereby creating unwanted heat as in the large coil configurations. This results in the ferrous coil limiting current passing through the circuit as well as limiting the actual size of the coil that can be used.

Unwanted heat and the actual overheating of the coils is a big problem in the protection of electronic circuits from overvoltages and surge currents. In some instances, U.L. temperature ratings are exceeded, causing the suppression device to be re-designed to comply with U.L. requirements. This of course can cause insufficient suppression capability for a particular surge suppression device, at the expense of U.L. compliance. This in turn translates into the possibility of a damaging surge or transient reaching the electrical equipment or data communication line that is positioned downstream from the suppression device.

Further, large surge currents can cause intense magnetic fields inside the ferrous cores and are known to saturate the core during these surges. This decreases the inductance; in fact, the inductance of the ferrous core coil can completely vanish if the core becomes completely saturated by an intense magnetic field.

Even though the ferrous core coil configuration is an improvement over the larger coil style alone, it still represents a limitation in the prior art which needs to be improved upon. It is also noted that series coil systems, due to coil size and their method of manufacture (i.e., ferrous core configurations) are expensive to build.

A further inherent disadvantage in series coil systems is that the ferrous cores store energy that reacts with the incoming surge current or like transient anomaly. Also, when series coils are combined with surge elements in a parallel configuration, they react to the switching of the surge elements and create a high frequency "ringing" surge voltage. This too is undesirable. These ringing high frequencies are not addressed by the prior art surge suppressors even though they can be extremely damaging to equipment downstream from the original surge voltage.

Another surge protection device that utilizes coils known in the prior art is a "common-mode choke". These devices insert large inductance in series on a common-mode line source (signals in which have identical amplitude and phases at both inputs). Common-mode chokes have two independent coils of the same size and the same number of turns. Typically they are wound on a toroidal-shaped ferrous core. However, many of the inherent problems that exist in the other ferrous core coils also exist here. Therefore common-mode chokes are considered inadequate for today's surge suppression and transient protection needs.

An improved surge suppression device is clearly needed that overcomes the inherent deficiencies in the prior art. Such improved device should not rely upon ferrous core style coils or very large air-core style coils. The improved surge suppression device should not limit the normal line current, yet it should adequately protect downstream electrical and data equipment by suppressing voltage and current surges and other like damaging transient anomalies. Further, overheating of the coils should be avoided to comply with U.L. requirements. In other words, coils cannot exceed temperature ratings when carrying circuit load current. For example, a series device plugged into a standard wall receptacle is tested to a full 15 amp load carrying capability and nothing within the device can exceed the temperature ratings for such a load. A typical problem with ferrous core coils is that they will reach temperature that will result in melting of the plastic cases, hence they will not pass normal load current tests.

SUMMARY OF THE INVENTION

I have invented an improved surge suppression device that overcomes the deficiencies in the prior art. My improved suppressor device does not rely upon ferrous cores and therefore is said to be a non-ferrous coil device. However, my device does not need to employ large air-core coils to overcome the lack of the ferrous core. My improved suppressor utilizes a highly reliable, low cost, dual-wound, non-ferrous core coil connected in series with other surge elements, such as, for example, metal oxide varistors (MOV)—a two-electrode solid state device having a voltage dependent nonlinear resistance which drops as the applied voltage increases.

My suppressor employs multiple conductive coils, one for each conductor, each protected by parallel surge elements. The coils are relatively small in size and have a low impedance due to the unique winding configuration. Each coil, placed in close proximity to one another, are wound such that the turns of the first coil are as far from parallel as possible to the turns of the second coil. In a preferred embodiment, the windings of the separate coils are placed at a 90 degree angle (perpendicular) from one another. Various winding schemes of the two coils can be employed to achieve the desired surge suppression result. The coils of the present invention are said to be dual-wound.

The surge suppression device of the present invention can be used with any electrical device or circuit or any data communication line. For example, my suppressor can be employed with three phase power circuits by use of three separate non-ferrous coils wound as described above in a substantially non-parallel (preferably perpendicular) configuration from one winding to the next. However, my suppressor is not limited and could also be employed in single phase circuits. For example, a dual-wound coil of the present invention can be employed between each conductor in a single phase circuit. Accordingly, a first dual-wound coil is connected between Phase A and Phase B, a second dual-wound coil is connected between Phase A and neutral and a third dual-wound is connected between Phase B and neutral. Accordingly, three coil pairs (dual-wound) are employed.

The present invention is also used with data communication line circuits, wherein multiple stage surge suppressors are employed which greatly improves communication type data line circuits by eliminating harmful impedance at high frequencies.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
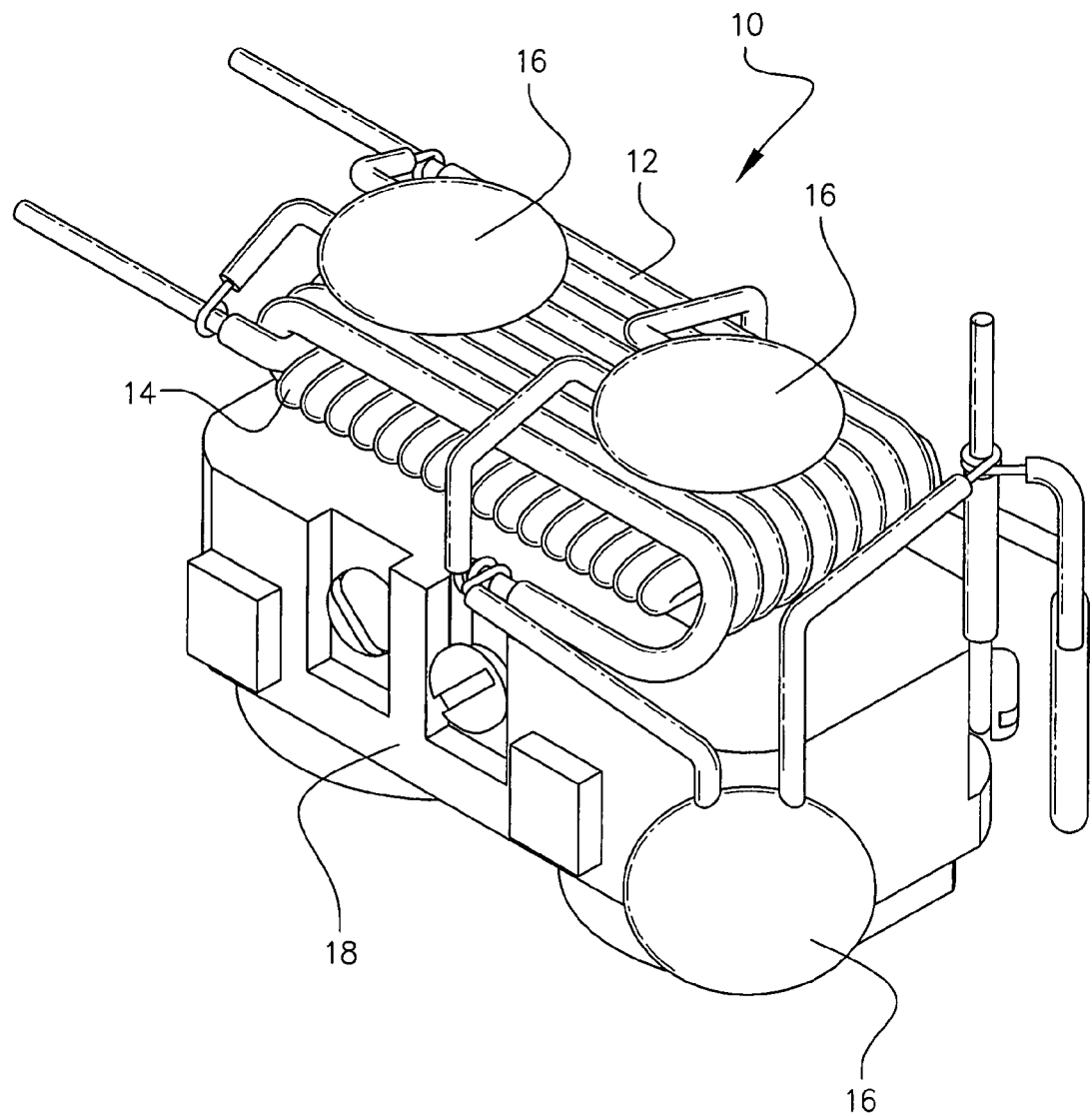
FIG. 1 illustrates a preferred non-ferrous surge biasing coil of the present invention wherein a pair of coils are employed and are positioned at an angle to one another such that the first of the pair of coils are sandwiched in between the second of the pair of coils and the surge biasing coils are mounted to an electrical receptacle.

Throughout the following detailed description, the same reference numerals refer to the same elements in all figures.

Referring to FIG. 1, a preferred embodiment of the present invention is shown. Therein, surge suppressor device 10 includes a first winding 12 and a second winding 14 such that second winding 14 is sandwiched in between (surrounded by) first winding 12. It is noted that suppressor 10, as shown in FIG. 1, discloses that first and second windings, 12 and 14 respectively, are positioned at a generally perpendicular angle (ninety degrees), what is considered the preferred embodiment. However, nothing herein limits suppressor 10 from having windings 12 and 14 positioned at angles different from that of the preferred embodiment. In fact windings 12 and 14 can be positioned at varying angles from that of 90 degrees so long as the windings are not positioned in a parallel relationship. It is further noted that suppressor 10 includes a plurality of metal oxide varistors (MOVs) 16 connected in series to windings 12 and 14 which help in the voltage and current suppression application. Suppressor 10 is also shown to be connected directly to an AC voltage outlet 18 which represents one application in which suppressor 10 can be used.

Figure 2:
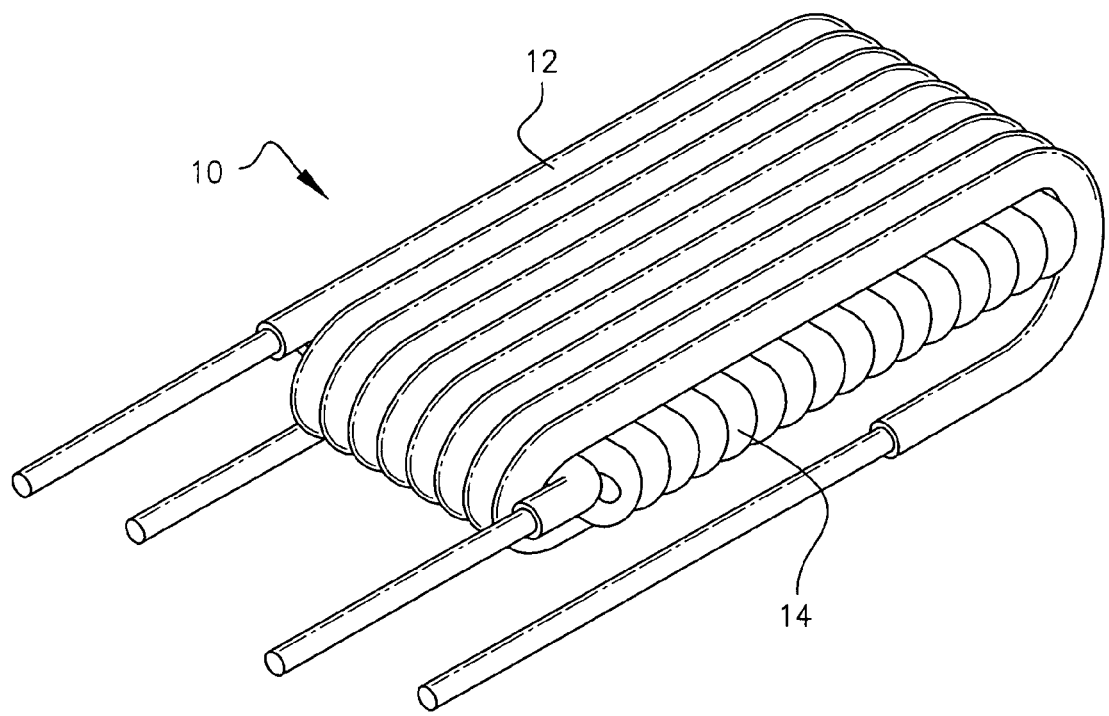
FIG. 2 illustrates the same coil as illustrated in FIG. 1, absence the other electrical components used in suppressing electrical surges in devices and data lines in the present invention.
Figure 3:
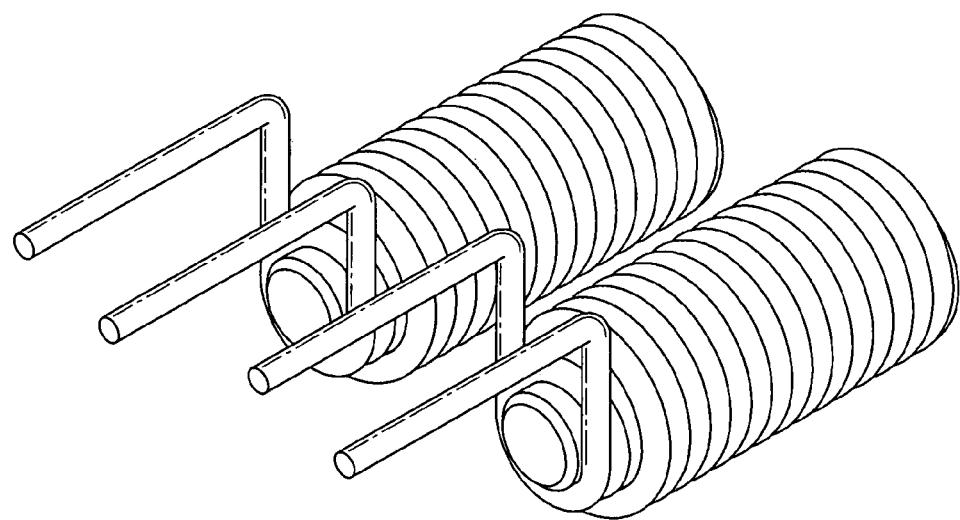
FIG. 3 illustrates a prior art surge device wherein a pair of coils are employed, each having a ferrous core sandwiched in between the windings of the coil, with each coil spaced apart from one another such that the coils are not positioned against each other in any fashion as in the present invention.

Referring now to FIG. 2, a more detailed depiction is shown of suppressor coil 10 wherein it can be clearly seen that second winding 14 is sandwiched in between (or surrounded by) first winding 12. Again, nothing herein limits that first and second windings 12 and 14 have to be displaced at a 90 degree angle as shown in FIG. 2. This merely reflects the preferred positioning. Angles of varying degrees can be employed (although not shown herein), so long as the windings are not displaced in a parallel relationship.

Figure 4:
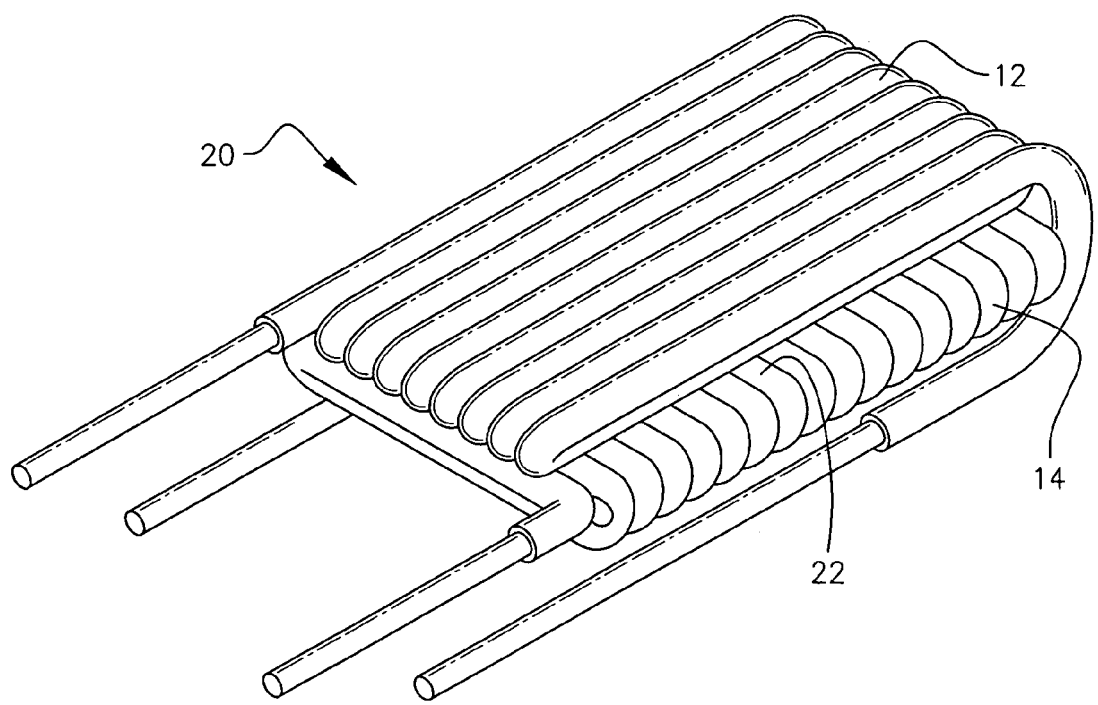
FIG. 4 illustrates an alternate non-ferrous surge biasing coil of the present invention wherein a pair of coils are employed and are positioned at an angle to one another such that the first of the pair of coils are positioned juxtaposed and on top of the second of the pair of coils.

Referring now to FIG. 4, an alternate embodiment is shown wherein suppressor 20 employs first and second windings 12 and 14 respectively wherein first winding 12 is positioned juxtaposed to a top surface 22 of second winding 14 wherein a small space separates first and second windings 12 and 14. This differs from that of suppressor 10 which employs the "sandwich" configuration. As shown in FIG. 4, the windings are also positioned at a right angle from one another which represents the preferred manner to construct alternate suppressor 20. However, again, nothing herein limits that first and second windings 12 and 14 have to be displaced at the 90 degree angle as shown in FIG. 4. Angles of varying degrees can be employed (although not shown herein) so long as the windings are not displaced in a parallel relationship.

Figure 5:
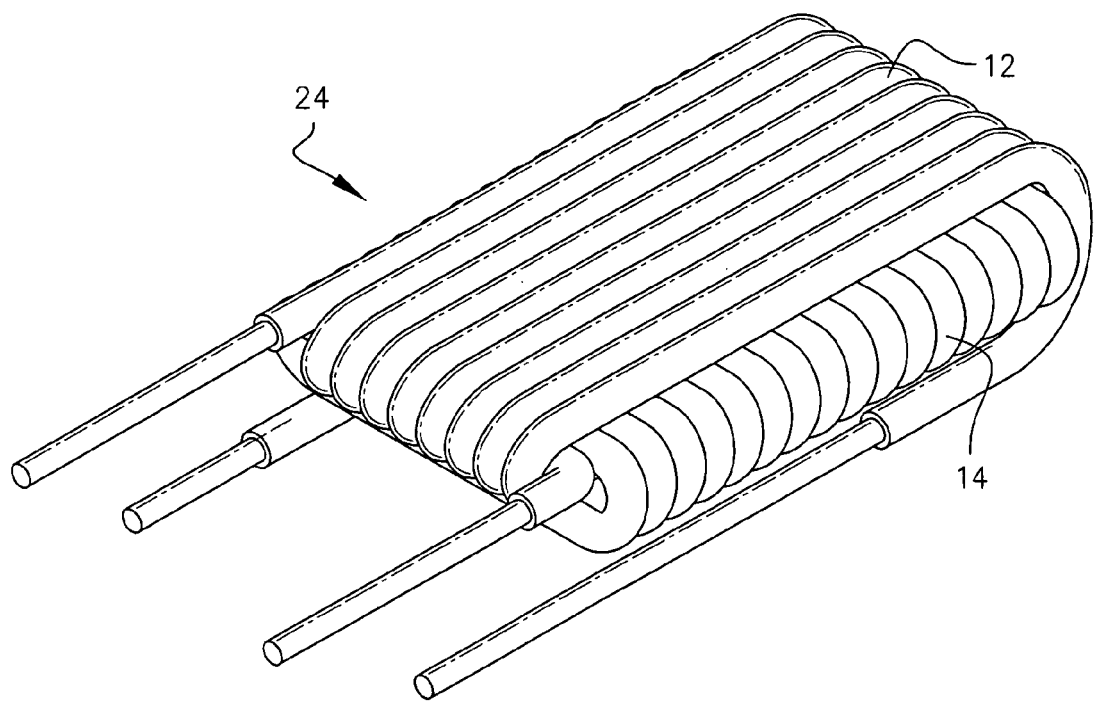
FIG. 5 illustrates an alternate non-ferrous surge biasing coil of the present invention wherein a pair of coils are employed and are positioned at an angle to one another such that the first of the pair of coils are intertwined with the second of the pair of coils.

Referring now to FIG. 5, another alternate embodiment is shown wherein suppressor coil 24 employs first and second windings 12 and 14 respectively wherein first winding 12 is intertwined with second winding 14 (such as like a weave). This differs from that of suppressor coils 10 and 20 which employs the "sandwich" configuration and the "one on top of the other" configuration, FIGS. 2 and 4 respectively. As shown in FIG. 5, the windings are again positioned at a right angle from one another which represents the preferred manner to construct alternate suppressor 24. However, once again, nothing herein limits that first and second windings 12 and 14 have to be displaced at the 90 degree angle as shown in FIG. 5. Angles of varying degrees can be employed (although not shown herein) so long as the windings are not displaced in a parallel relationship.

Figure 6:
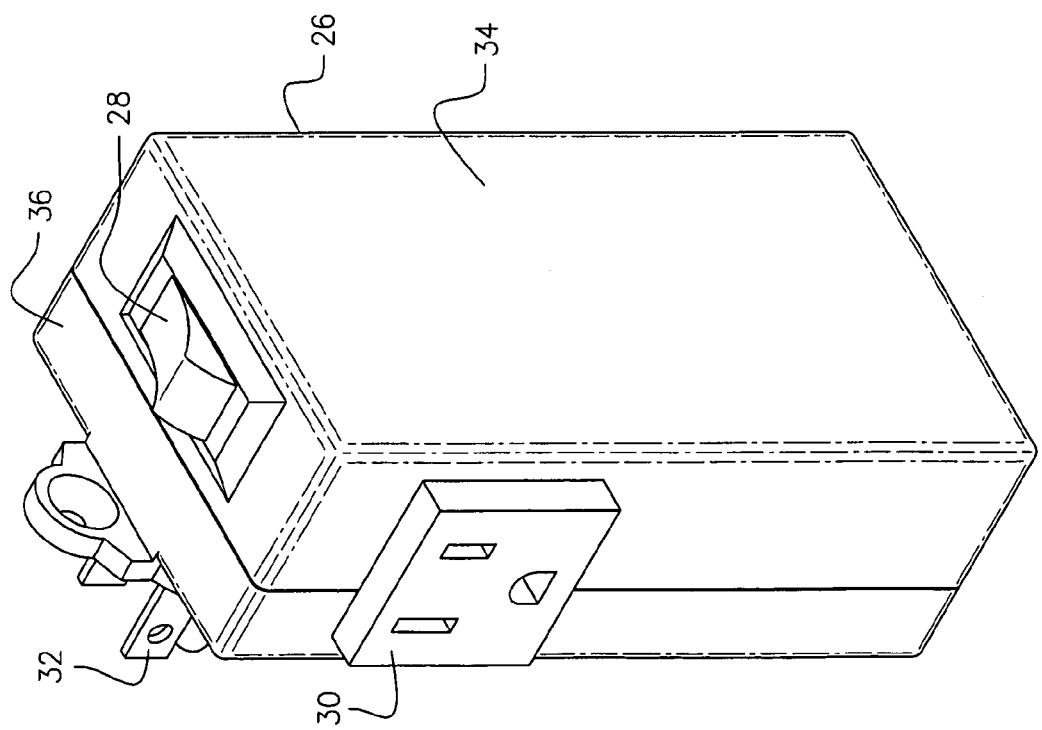
FIG. 6 illustrates a first box used in electrical device surge protection wherein the non-ferrous surge biasing coil of the present invention is employed within the box and the box is inserted directly into an AC outlet.

Suppressor coils 10, 20 and 24 can be used with a multitude of different applications. As shown in FIG. 6, a "plug-in" AC voltage box 26 can enclose suppressor coil 10, 20 or 24 and plug directly into any AC circuit power line. Box 26 includes an on/off switch 28, an AC receptacle 30 and an AC plug 32. Box 26 also includes a top and bottom portion, 34 and 36 respectively, which are used to enclose suppressor coil 10, 20 or 24 there within. A piece of electrical equipment would then plug into receptacle 30 and be protected against voltage and current surges when on/off switch 28 is positioned in the "on" state.

Figure 7:
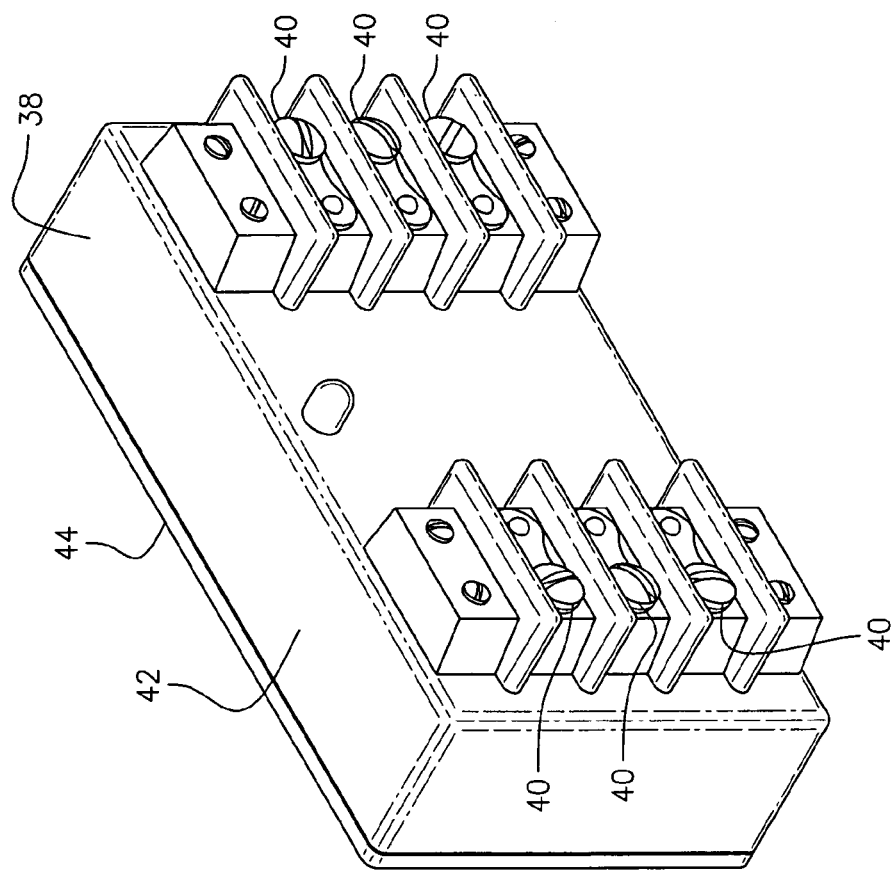
FIG. 7 illustrates a second box used in electrical device surge protection wherein the non-ferrous surge biasing coil of the present invention is employed within the box and the box is hard-wired directly to an AC power source.

As shown in FIG. 7, suppressor coil 10, 20 or 24 can also be enclosed within a hard-wired suppressor box 38. In this embodiment, a plurality of terminals 40 are provided which are used to directly "hard-wire" electrical equipment to box 38. Hard-wire box 38 also includes a top and bottom portion, 42 and 44 respectively, which are used to enclose suppressor coil 10, 20 or 24.

Although not shown, suppressor coil 10, 20 and 24 can also be employed with data communication line applications including phone and computer lines and any other type of data communication line.

Equivalent elements can be substituted for the ones set forth above such that they perform in the same manner in the same way for achieving the same result.

What is claimed is:

1. A surge suppression and protection device for use with electrical equipment and devices and data communication lines having a first conduction path and a second conduction path, the surge suppression and protection device comprising:
   a) an inner coil wound substantially inside an outer coil, the inner coil having a first winding, the outer coil having a second winding, the first and second windings placed at substantially a 90 degree angle to one another, the inner coil connected in series with the first conduction path and the outer coil connected in series with the second conduction path, and
   b) at least one surge element connected between the first conduction path and the second conduction path.

2. The surge suppression and protection device of claim 1, wherein the outer coil second winding substantially surrounds the inner coil first winding.

3. The surge suppression and protection device of claim 1, wherein the multitude of surge elements are chosen from the group consisting of metal oxide varistors, avalanche diodes and gas tubes.

4. The surge suppression and protection device of claim 3, wherein a metal oxide varistor is employed for each of the first and second coils.

5. The surge suppression and protection device of claim 1, wherein the electrical equipment and devices are connected to an electrical power line having a phase chosen from the group consisting of single, two and three phase lines.

6. The surge suppression and protection device of claim 1, wherein the device is connected directly to an AC electrical receptacle.

7. The surge suppression and protection device of claim 1, wherein the device is completely enclosed within a box having a housing.

8. The surge suppression and protection device of claim 7, wherein the box comprises an AC plug mounted on a back side of the housing for inserting within an AC receptacle of a power line and at least one AC receptacle mounted on the box housing such that it is accessible for receiving a plug of an electrical device.

9. The surge suppression and protection device of claim 8, wherein the box further comprises a switch mounted on the housing for providing an on/off toggle for the surge suppression and protection device.

10. The surge suppression and protection device of claim 7, wherein the box comprises a plurality of terminals for hard-wiring electrical equipment or devices or data communication lines directly to the surge suppression and protection device.

11. The surge suppression and protection device of claim 1, wherein the outer coil second winding substantially surrounds the inner coil first winding and the inner coil first winding has an air core.

12. A surge suppression and protection device for use with electrical equipment and devices and data communication lines having a first conduction path and a second conduction path, the surge suppression and protection device comprising:
   a) a first coil and a second coil, the first coil connected in series with the first conduction path and the second coil connected in series with the second conduction path, a bottom surface of the first coil touching a top surface of the second coil, and windings of the first coil and windings of the second coil placed at an angle of substantially 90 degrees to one another,
   b) at least one surge element selected from the group consisting of metal oxide varistors, avalanche diodes and gas tubes, the at least one surge element connected between the first conduction path and the second conduction path.

13. The surge suppression and protection device of claim 12, wherein the top surface of the second coil and the bottom surface of the first coil is separated by a small air space.

14. The surge suppression and protection device of claim 12, wherein the electrical equipment and devices are connected to an electrical power line having a phase chosen from the group consisting of single, two and three phase lines.

15. The surge suppression and protection device of claim 12, wherein the device is completely enclosed within a box having a housing.

16. The surge suppression and protection device of claim 15, wherein the box comprises an AC plug mounted on a back side of the housing for inserting within an AC receptacle of a power line, at least one AC receptacle mounted on the housing such that it is accessible for receiving a plug of an electrical device and a switch mounted on the housing for providing an on/off toggle for the surge suppression and protection device.

17. The surge suppression and protection device of claim 15, wherein the box comprises a plurality of terminals for hard-wiring electrical equipment or devices or data communication lines directly to the surge suppression and protection device.

18. The surge suppression and protection device of claim 12, wherein the windings of the first coil are disposed on an air core and the windings of the second coil are disposed on an air core.

* * * * *